(12) United States Patent
Nykamp et al.

(10) Patent No.: US 7,078,085 B2
(45) Date of Patent: Jul. 18, 2006

(54) COVER FOR METAL OFFICE FURNITURE

(75) Inventors: Richard W. Nykamp, Jenison, MI (US); David A. Steil, Grandville, MI (US)

(73) Assignee: The R & D Companies, LLC, Hudsonville, MI (US)

( * ) Notice: Subject to any disclaimer, the term of this patent is extended or adjusted under 35 U.S.C. 154(b) by 718 days.

(21) Appl. No.: 09/999,400

(22) Filed: Nov. 15, 2001

(65) Prior Publication Data

US 2003/0091784 A1 May 15, 2003

(51) Int. Cl.
*B32B 3/06* (2006.01)
*B32B 3/10* (2006.01)
*G09F 7/04* (2006.01)
*B65D 65/02* (2006.01)
*B65D 85/00* (2006.01)

(52) U.S. Cl. .................. 428/99; 428/98; 428/900; 428/131; 428/137; 40/600; 150/158

(58) Field of Classification Search .............. 428/99, 428/98, 900, 131, 137; 150/158; 40/600
See application file for complete search history.

(56) References Cited

U.S. PATENT DOCUMENTS

| | | | | |
|---|---|---|---|---|
| 4,996,110 A | * | 2/1991 | Tanuma et al. | 428/343 |
| 5,503,891 A | * | 4/1996 | Marshall et al. | 428/99 |
| 5,799,423 A | * | 9/1998 | Malino | 40/107 |
| 5,994,990 A | * | 11/1999 | Ogikubo | 335/285 |
| 6,217,958 B1 | * | 4/2001 | Blyden et al. | 428/31 |

* cited by examiner

*Primary Examiner*—Harold Pyon
*Assistant Examiner*—Catherine A. Simone
(74) *Attorney, Agent, or Firm*—Warner Norcross & Judd

(57) ABSTRACT

A magnetic decorative cover for metal office furniture. The cover is a lamination of a decorative layer to a magnetic sheet. The decorative layer is selected from a wide variety of materials to provide a desired appearance, to coordinate an office decor, or to blend office furniture together. Suitable decorative materials include fabric, vinyl, leather, wood veneer, marker-board surface, and high-pressure laminate. In the preferred manufacturing method, the laminated materials are laser cut and/or die cut to provide crisp, sharp, non-raveling edges.

3 Claims, 3 Drawing Sheets

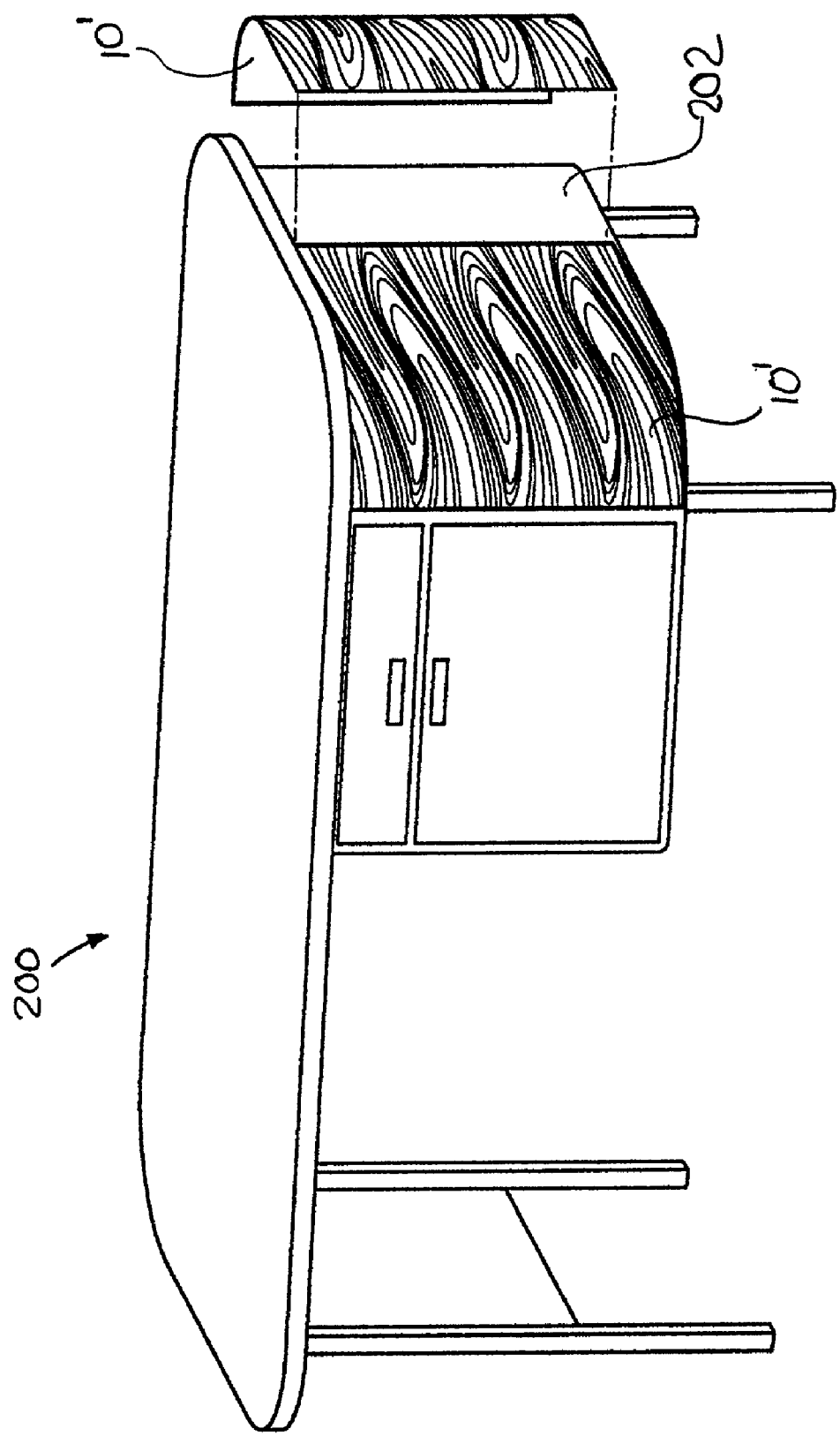

COVER FOR METAL OFFICE FURNITURE

BACKGROUND OF THE INVENTION

The present invention relates to metal office furniture, and more particularly to decorative covers for metal office furniture.

Metal office furniture is one of the backbones of the office environment. Exemplary pieces include file cabinets, desks, and drawer pedestals. Metal office furniture is fabricated of steel and then painted, making it both functional and durable.

Several negative issues are related to metal office furniture. First, the appearance of such furniture typically is regarded as tolerable rather than attractive. For example, a large bank of filing cabinets presents a sea of uniform color, such as beige or gray.

Second, the colors with which the furniture is painted go out of style. To change color, it is necessary either to purchase new furniture or to repaint existing furniture. The first option is undesirably expensive, and the second option is undesirably inconvenient.

Third, the finishes of metal furniture occasionally are scratched or otherwise marred, so that they are unsightly. In such cases, it is necessary to replace the furniture (or at least the damaged components) or to repaint the furniture (or at least the damaged components).

Fourth, when an office buys additional or replacement office furniture, one challenge is matching the color of the new office furniture to the existing furniture. The new office furniture may be made by a different manufacturer offering different colors, or may be made by the same manufacturer no longer offering the old colors. Even if a color is still made by the previous manufacturer, the new office furniture may not match the existing furniture due to fading, different dye runs of paint, or changes in the manufacturing process, such as switching from a wet paint to a powdercoat.

SUMMARY OF THE INVENTION

The aforementioned problems are overcome by the present invention that is a magnetic decorative cover for metal office furniture. More specifically, the cover includes a decorative layer laminated to a magnetic backing. The decorative layer may be fabric, vinyl, leather, veneer, marker-board surface, high-pressure laminate, or virtually any other material selected to provide a desired appearance.

The magnetic backing allows the cover to be easily, quickly, and releasably attached to furniture. The covers may be easily removed or changed without damaging the office furniture.

In the preferred embodiment, the cover is configured to match specific office furniture elements such as flipper doors and/or drawer fronts on filing cabinets. More specifically, the cover is dimensioned to extend the full height and width of the component, so that little or none of the underlying painted surface is exposed. Even more specifically, the cover includes cut-outs configured to fit over furniture components, such as drawer pulls and locks.

The present invention provides an office furniture cover that allows a user to change the style, color and look of office furniture. It also allows an office to update, replace, remodel, and buy additional office furniture without worrying if the additional office furniture will match the old office furniture. Therefore, an office may remodel, add new furniture, or change the style of existing office furniture at significant cost savings over buying new office furniture.

These and other objects, advantages, and features of the invention will be more readily understood and appreciated by reference to the detailed description of the preferred embodiment and the drawings.

BRIEF DESCRIPTION OF THE DRAWINGS

FIG. 3 is a perspective view of a desk showing one cover installed and one cover aligned for placement.

DETAILED DESCRIPTION OF THE PREFERRED EMBODIMENT

Figure 1:
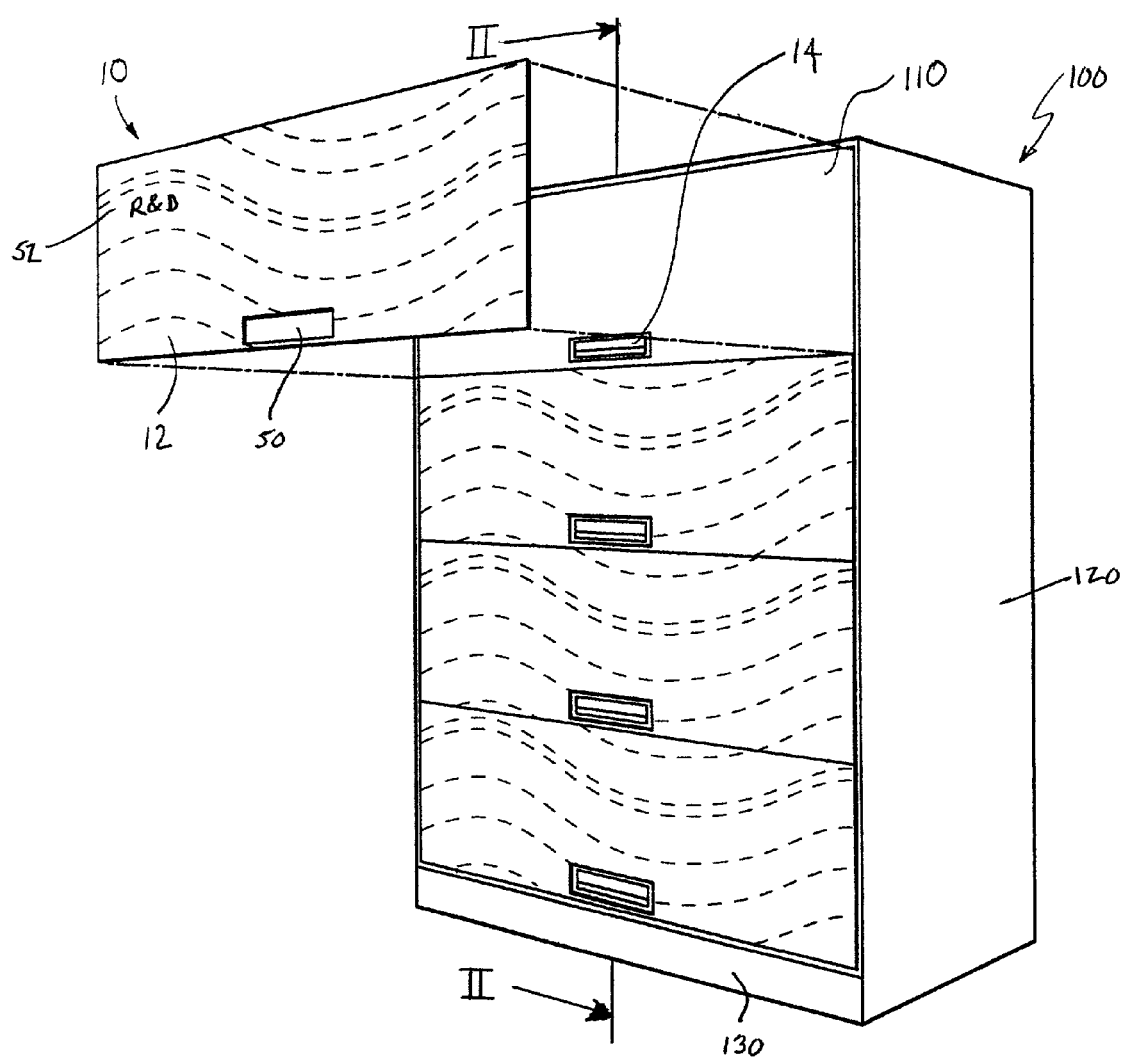
FIG. 1 is a perspective view of a file cabinet showing covers installed on three drawers and one additional cover aligned for placement on a fourth drawer.
Figure 2:
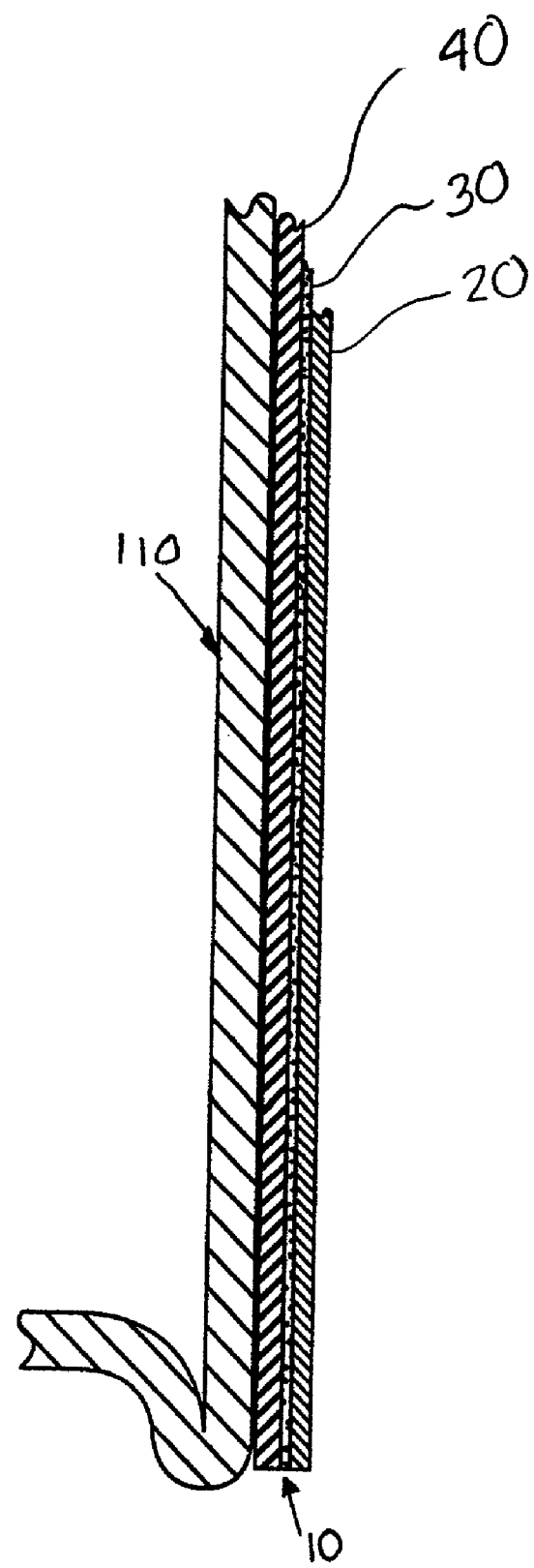
FIG. 2 is a fragmentary sectional view taken along the line II—II in FIG. 1.

A decorative office furniture cover constructed in accordance with a preferred embodiment of the invention is shown in FIGS. 1–2 and generally designated 10. The cover 10 includes a decorative layer 20, a magnetic backing 40, and an adhesive layer 30 interconnecting the two. The cover 10 is designed for installation on an office furniture element, such as the drawer front 110 of the filing cabinet 100.

I. Construction

The decorative layer 20 is any material that provides the desired aesthetic appearance in terms of color and texture. In the preferred embodiment, the decorative layer 20 is a fabric, for example of the type used in other office furniture applications such as upholstery. Other suitable materials include leather, vinyl, wood veneer, and marker-board surface. High-pressure laminates providing, for example, marble or granite appearances may also be used. Additional materials will be readily apparent to those skilled in the office furniture art.

The backing 40 is a flexible magnetic sheet of the type well known in a variety of applications, such as refrigerator magnets, advertising signs, vent covers, and labels. Flexible magnetic sheet material is well known in the art and is made of a base ferrite powder combined with a binder such as rubber, PVC, or other materials. Sheets having a variety of magnetic, flexibility, and other properties are available and will depend on the ferrite powders and binders used in fabricating the sheets. Flexibility allows the cover 10 to be rolled, for example, for shipping or storage. Flexibility also facilitates installation of the cover onto the furniture.

The decorative layer 20 is laminated or adhered to the backing 40 by the adhesive layer 30, as shown in FIG. 2. Appropriate lamination processes and equipment are well known to those skilled in the lamination art, and will not be described here in detail. Similarly, appropriate adhesives also are well known and will be selected to provide the required binding strength between the decorative layer 20 and the backing 40. Accordingly, the selected adhesive will depend in part on the materials selected for the decorative layer 20 and the backing 40.

The cover 10 is intended for installation on the drawer front 110 of the filing cabinet 10. The application alternatively could be any article of metal office furniture, such as flipper doors, file cabinets, overhead storage bins, other storage units, desks, and bookshelves. The surface on which the cover is installed could be virtually any metal component of the office furniture article. For example, the component could be the curved pedestal 202 of the desk 200 illustrated in FIG. 3.

As seen in FIGS. 1–2, the cover is preferably dimensioned to cover the entire surface of the component, for example the drawer front 110, on which it is installed. Specifically, the cover 10 extends the full height and width of the drawer front 110 to provide the most dramatic and effective change in the appearance of the cabinet 100. Although not illustrated, other components of the furniture article (e.g. the side panels 120 and the base 130) can be covered with differently sized covers. In that case, each cover preferably extends the full height and width of the covered component.

The cover 10 also includes a cutout 50 aligned with the pull 14, so that the pull is clearly visible and accessible through the cover 10. Other functional cutouts (not shown) can be included as necessary to accommodate other structural aspects of the component to be covered.

The cover 10 also can include one or more decorative cutouts 52. As shown in the drawings, the cutout is a university or college logo. Other options include, corporate names and logos, advertising, and decorative designs. These cutouts permit the underlying color of the office furniture to show through the decorative cover 10 to provide contrast with the decorative front 20. If that color is not acceptable or appropriate, a small piece of colored material (e.g. paper, plastic, or fabric—not shown) can be positioned on the back surface of the cover to provide the desired contrast or other aesthetic appearance through the cutouts. It also is contemplated that contrasting or otherwise aesthetically pleasing inlays could be placed within the cutouts.

II. Manufacture and Installation

The decorative layer 20 is laminated to the base sheet 40 using well known processes and equipment. Typically, both materials are purchased in roll form. Alternatively, either or both materials may be purchased in sheet form. Sometimes, and as is customary in the office furniture field, the customer will specify the material (i.e. customer owned materials or COM) to be used as the decorative layer 20. Sometimes, the material will be selected to match other fabrics widely used in the office furniture market, for example, for upholstery. Other times, the material will be selected to provide appearances, for example, wood veneer, not typically associated with metal office furniture.

The laminated sandwich then is cut to the desired dimensions. Typically, these dimensions will correspond to the dimensions of components of well known furniture articles. In other cases, the dimensions will be dictated by a customer's specifications. Any suitable cutting method can be used. Laser cutting is one preferred technique. Laser cutting provides an extremely sharp or crisp edge. When the decorative layer is a synthetic fabric, laser cutting prevents unraveling of the cut edge because the fabric is melted and fused together.

Particularly when laser cutting is used, the cutting is computer controlled. The templates are unique to each cover, and include information regarding (1) the overall dimensions of the cover and (2) functional or decorative cutouts in the cover. As noted above, the templates can correspond to "stock" covers or they can correspond to customer specified covers. In either case, the template is stored for future access and use in case of subsequent orders for the same cover. Using a computer template increases quality and reduces necessary set-up time.

Die-cutting is another preferred technique. Die-cutting is believed to be less expensive than laser cutting for relatively high-volume runs of "stock" sizes. Particularly when die-cutting is used, the fabric may be back-coated prior to lamination to reduce unraveling after cutting. Back-coating is a well-known technique for reducing the wear rate of the fabric and for preventing unraveling of the fabric.

It also is contemplated that a single cover 10 may be both die-cut (e.g. for overall size and cutouts to receive physical features of the furniture) and laser cut (e.g. for sophisticated decorative cutouts).

The decorative cover 10 is installed onto the office furniture components by rolling the cover slightly, aligning one or more edges of the cover with the component, and allowing the cover to unroll and to attach to the component under the influence of the magnetic force.

The covers 10 can dramatically change the appearance of an article of metal office furniture. Specifically, the covers convert painted surfaces to surfaces having virtually any color and texture. As noted above, the surfaces can be fabric, vinyl, veneer, or virtually any other desired material—so long as that material is capable of lamination to the magnetic sheet. The cover 10 also enables office furniture of different colors to have an aesthetically consistent appearance. The cover 10 further enables painted furniture to more closely match other materials to provide a more consistent office decor.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The invention claimed is:

1. An article of office furniture comprising:
    a metal office furniture piece including a plurality of components each having dimensions, one of said components including a physical feature; and
    a plurality of magnetic decorative covers, each of said covers overlying and attached to one of said components, each of said covers having dimensions substantially the same as the dimensions of the component to which the cover is attached, each of said covers comprising a magnetic sheet and a decorative material, the decorative cover attached to said one component defining a cutout aligned with said physical feature.

2. The article of office furniture as defined in claim 1 wherein said magnetic sheet is flexible.

3. The article of furniture as defined in claim 1 wherein one of said decorative covers defines a cutout providing an aesthetic appearance such as a logo.

* * * * *